United States Patent
Li et al.

(10) Patent No.: US 11,088,968 B2
(45) Date of Patent: Aug. 10, 2021

(54) CONTROLLING SOCKET RECEIVE BUFFER FOR TRAFFIC OPTIMIZATION

(71) Applicant: Verizon Patent and Licensing Inc., Arlington, VA (US)

(72) Inventors: Feng Li, Lexington, MA (US); Haim S. Ner, Fair Lawn, NJ (US); Lily Zhu, Parsippany, NJ (US); Parry Cornell Booker, Arlington, TX (US)

(73) Assignee: Verizon Patent Licensing Inc., Basking Ridge, NJ (US)

( * ) Notice: Subject to any disclaimer, the term of this patent is extended or adjusted under 35 U.S.C. 154(b) by 11 days.

(21) Appl. No.: 16/566,101

(22) Filed: Sep. 10, 2019

(65) Prior Publication Data
US 2021/0075744 A1    Mar. 11, 2021

(51) Int. Cl.
*H04L 12/861* (2013.01)
*H04L 12/26* (2006.01)
*H04L 12/925* (2013.01)

(52) U.S. Cl.
CPC .......... *H04L 49/9005* (2013.01); *H04L 43/16* (2013.01); *H04L 47/722* (2013.01); *H04L 49/9084* (2013.01)

(58) Field of Classification Search
CPC ............... H04L 49/9005; H04L 47/722; H04L 49/9084; H04L 43/16
See application file for complete search history.

(56) References Cited

U.S. PATENT DOCUMENTS

| | | | |
|---|---|---|---|
| 2005/0226272 A1* | 10/2005 | Luby | H04L 69/16 370/473 |
| 2012/0008495 A1* | 1/2012 | Shen | H04L 65/1069 370/230 |
| 2013/0019025 A1* | 1/2013 | Chaturvedi | H04L 65/80 709/231 |
| 2013/0148507 A1* | 6/2013 | Wen | H04W 40/22 370/237 |
| 2017/0244651 A1* | 8/2017 | Saxton | H04L 49/9047 |

* cited by examiner

*Primary Examiner* — Dady Chery

(57) ABSTRACT

A network device includes a network interface for establishing a communication session with another network device, a memory to store instructions, and a processor to execute the instructions. The processor may, for each time period during the communication session, adjust a size of a receive buffer of a socket. When the processor adjusts the size, the processor, if a utilization number of the receive buffer is greater than a high threshold: may determine a first new size for the receive buffer, and set a size of the receive buffer to the first new size. If the utilization number is less than a low threshold, the processor may determine a second new size for the receive buffer; and set the size of the receive buffer to the second new size.

20 Claims, 8 Drawing Sheets

| PARAMETER | EXAMPLE DEFAULT VALUE |
|---|---|
| $RWIN_{MAX}$ | PROVIDED BY DEVICE |
| $RWIN_{MIN}$ | 32 OR 64K |
| $M$ | 64 MB |
| $RTT$ | 60 MILLISECONDS |
| $BW$ | 100 MBPS |
| $T_{HIGH}$ | 0.5 |
| $T_{LOW}$ | 0.25 |
| $\beta$ | 2 |
| $\gamma$ | 0.5 |

CONTROLLING SOCKET RECEIVE BUFFER FOR TRAFFIC OPTIMIZATION

BACKGROUND INFORMATION

Millimeter wave bands have attracted considerable attention for the Fifth Generation (5G) cellular networks. The millimeter bands offer more spectra than other current advanced networks (e.g., Fourth Generation (4G) Long-Term Evolution (LTE) networks), to provide greater capacity (e.g., 2 Gigabits per second) and less latency. This is creating new traffic optimization challenges for mobile network operators as more technologically advanced smart phones, with greater Central Processing Unit (CPU) processing power and memory, make use of the millimeter bands.

DETAILED DESCRIPTION F PREFERRED EMBODIMENTS

The following detailed description refers to the accompanying drawings. The same reference numbers in different drawings may identify the same or similar elements.

Advanced networks of today provide high quality services to users of communication devices (e.g., User Equipment (UE) devices) based on various network and device parameters. In some situations, the networks may receive values of the parameters from the UE devices. However, in other situations, such signaling can result in inadvertent sub-optimal performance of the devices. For example, when a UE device communicates with a network device or another UE device over the network (e.g., the service provider network), the UE device may establish a session, during which multiple messages are exchanged by the participating devices. When the session is established, a communication channel is created over multiple network layers.

To establish a session at the transport layer (i.e., layer four (L4) of the OSI model), a device that is to participate in the session allocates a socket. The socket represents one endpoint of the session and is characterized by various parameters that are relevant to the continued exchange of messages between the application instances at the session endpoints. In particular, the parameters include memory addresses of a transmit buffer and a receive buffer, which are allocated when the application creates or initializes the socket. The transmit buffer stores information to be sent to the other endpoint of the session, while the receive buffer temporarily stores information received from the other endpoint of the session, until the application instance can process the received information.

A communication device that participates in a session can allocate the transmit buffer and the receive buffer in various ways. Whatever methods that the device uses, however, can impact the overall performance of the device, performance of the network over which the session is maintained, and performance of the device at the other session endpoint. For example, a UE device may over-allocate or under-allocate a receive buffer or fail to properly adjust the size of the receive buffer during the session. Such buffer allocation and maintenance schemes can result in sub-optimal performance of the devices at session endpoints.

Figure 1:
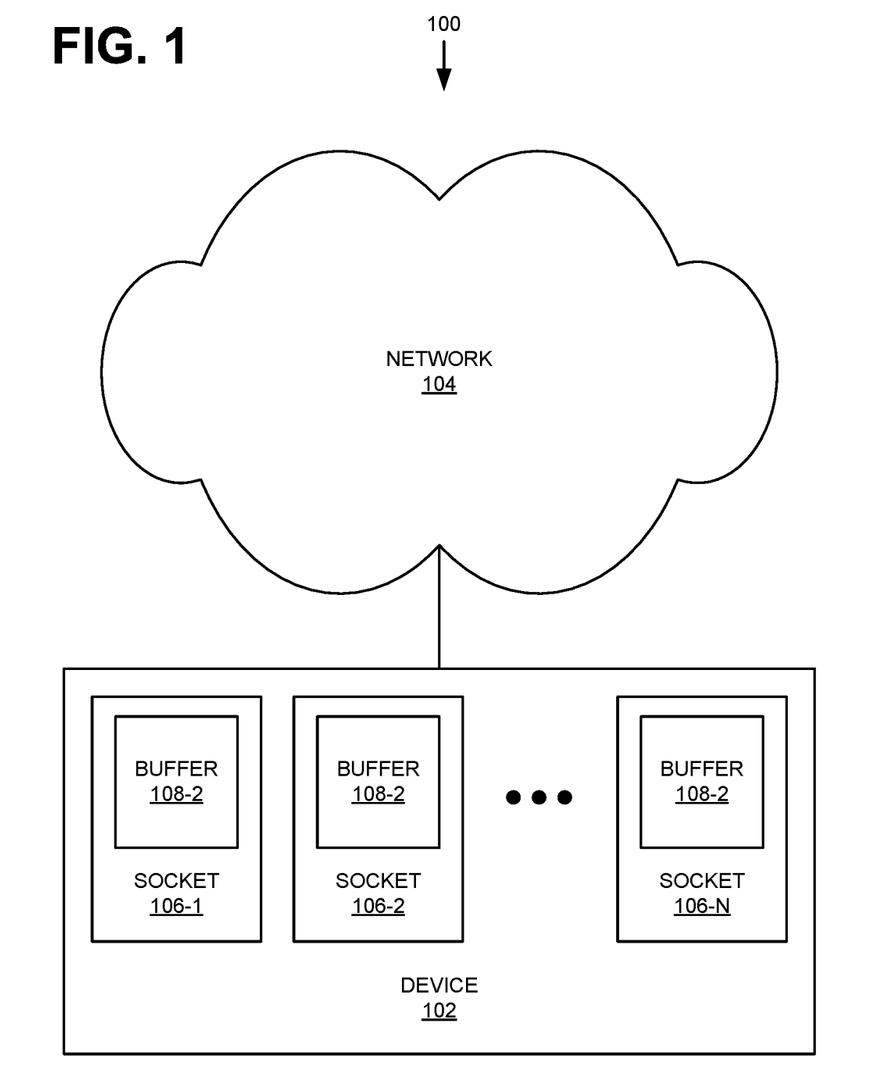
FIG. 1 illustrates an exemplary network environment in which the concepts described herein may be implemented.

The systems and methods described herein relate to allocation of buffers, especially receive buffers in the devices at the session endpoints. The systems and methods may lead to optimization of and a reduction in unused portions of session buffers at the session endpoint devices. FIG. 1 illustrates an exemplary network environment 100 in which these concepts may be implemented. As shown, network environment 100 includes a device 102 and a network 104.

Device 102 may include a communication device. Examples of device 102 include: a personal computer that is connected to a network; a smart phone; a tablet device; a wearable computer device (e.g., a smart watch); a global positioning system (GPS) device; a laptop computer; a media playing device; a portable gaming system; and an Internet-of-Thing (IoT) device. In some implementations, device 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. Device 102 may send packets over or to network 104 through a wireless link, optical link, wired link, etc.

Network 104 may provide device 102 with network services. Network 104 may include an access network (e.g., a radio network), which allows device 102 to access network 104. To do so, network 104 may establish and maintain, with participation from device 102, an over-the-air or over-the-wire channel with device 102; and maintain backhaul channels with a core part of network 104.

Network 104 may include one more access networks, such as wireless access networks. The access networks may include a Long-term Evolution (LTE) radio network, a 5G radio network, or other advanced radio network(s). These radio networks may include many wireless stations for establishing and maintaining an over-the-air channel with device 102.

Network 104 may also include a local area network (LAN), a wide area network (WAN), a metropolitan area network (MAN), an optical network, a cable television network, a satellite network, a wireless network (e.g., a CDMA network, a general packet radio service (GPRS) network, an LTE network (e.g., a 4G network), a 5G network, an ad hoc network, a telephone network (e.g., the Public Switched Telephone Network (PSTN), an intranet, or a combination of networks. Network 104 may allow the delivery of Internet Protocol (IP) services to device 102, and may interface with other networks, such as packet data networks. In some implementations, the packet data networks may include an IP network, such as an IP Multimedia Subsystem (IMS) network. An IMS network may provide a Short Messaging Service (SMS), Voice-over-IP (VoIP) service, etc.

In FIG. 1, device 102 is depicted as maintaining N-sessions with network 104 or over network 104. Device 102 includes sockets 106-1 through 106-N (herein collectively referred to as "sockets 106" or generically as "socket 106"). Each socket 106 corresponds to one endpoint of the corresponding session. Although not shown, each of the N-sessions has at least another endpoint at one or more devices of network 104. Furthermore, although FIG. 1 shows the sockets 106 as being included in device 102, in other implementations, sockets 106 may be distributed over multiple devices 102.

Each socket 106 may store parameter values that pertain to the corresponding session and includes a receive buffer 108. For simplicity, FIG. 1 does not show all components of socket 106 (e.g., transmit buffer, port number, etc.).

When device 102 establishes a session, device 102 creates a socket 106 and allocates a buffer 108 from a memory pool. As briefly mentioned above, receive buffer 108 temporarily stores information or data received from the other end of the corresponding session, until the application associated with the session processes the stored information/data. As explained below with reference to FIGS. 3A-3C, how efficiently device 102 uses receive buffers 108 may depend on how device 102 allocates and maintains receive buffer 108.

Depending on the implementation, network environment 100 may include networks other than network 104. Furthermore, for simplicity, FIG. 1 does not show all components that may be included in network environment 100 (e.g., routers, bridges, wireless access point, additional devices 102 with additional sockets 106 and buffers 108, wireless stations, etc.). That is, depending on the implementation, network environment 100 may include additional, fewer, different, or a different arrangement of components than those illustrated in FIG. 1.

Figure 2:
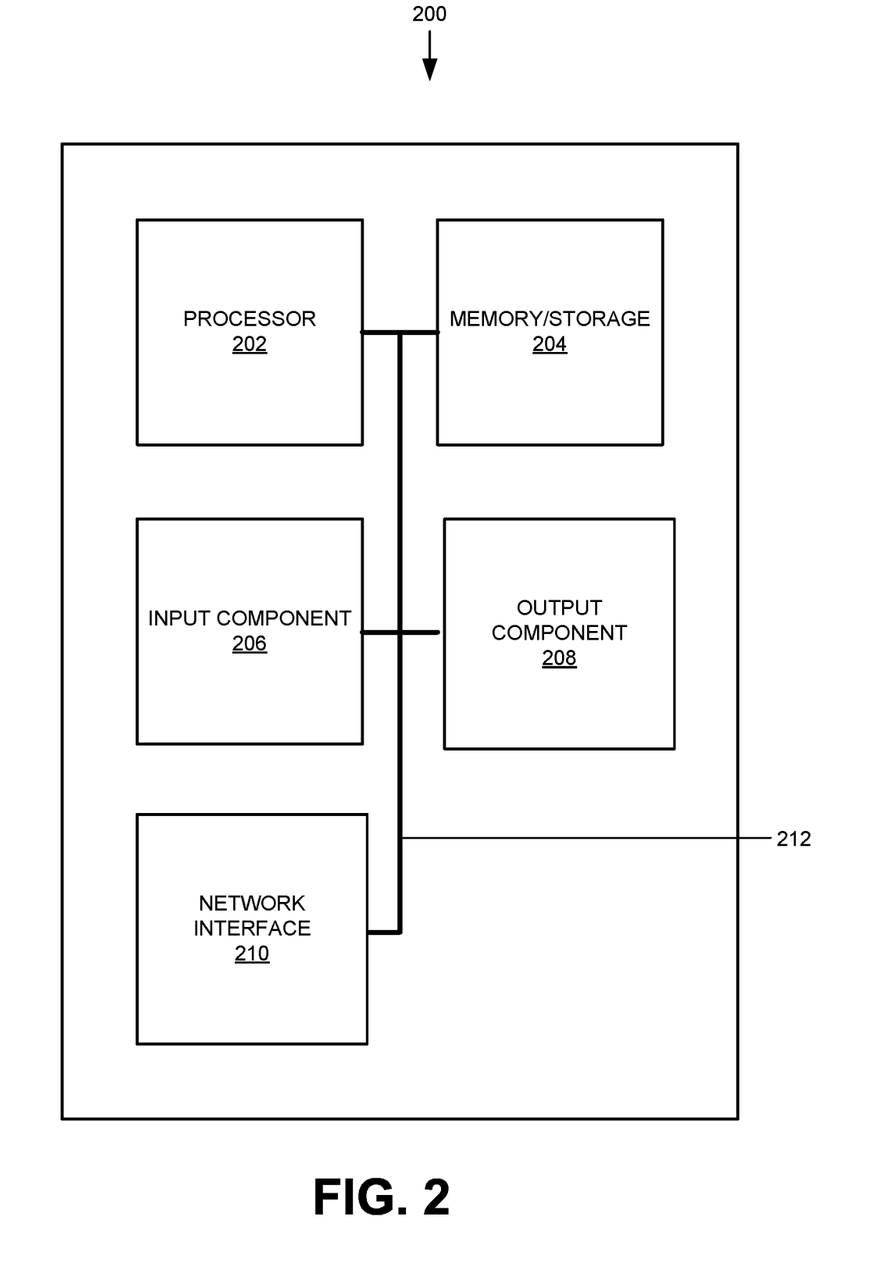
FIG. 2 depicts exemplary components of an exemplary network device that is included in the network environment of FIG. 1.

FIG. 2 depicts exemplary components of an exemplary network device 200. Network device 200 may correspond to or may be included in any of network components of FIG. 1 (e.g., device 102, a router, a network switch, servers, gateways, etc.). As shown, network device 200 may include a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), graphical processing unit (GPU), microcontrollers, and/or other processing logic (e.g., embedded devices) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.). The RAM may be used to map out a virtual memory, from which receive buffers 108 may be allocated. In some implementations, allocation of buffers 108 may be executed through an automatic memory manager, such as a garbage collector.

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input/output components 206 and 208 may include a display screen, a keyboard, a mouse, a speaker, a microphone, a camera, a DVD reader, USB lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate over a network, such as the Internet, an intranet, a terrestrial wireless network (e.g., a WLAN, WiFi, WiMax, etc.), a satellite-based network, optical network, etc.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of network device 200 to communicate with one another.

Network device 200 may perform the operations described herein in response to processor 202 executing software instructions stored in a non-transient computer-readable medium, such as memory/storage 204. The software instructions may be read into memory/storage from another computer-readable medium or from another device via network interface 210. The software instructions stored in memory/storage (e.g., memory/storage 204, when executed by processor 202, may cause processor 202 to perform processes that are described herein.

Figure 3A:
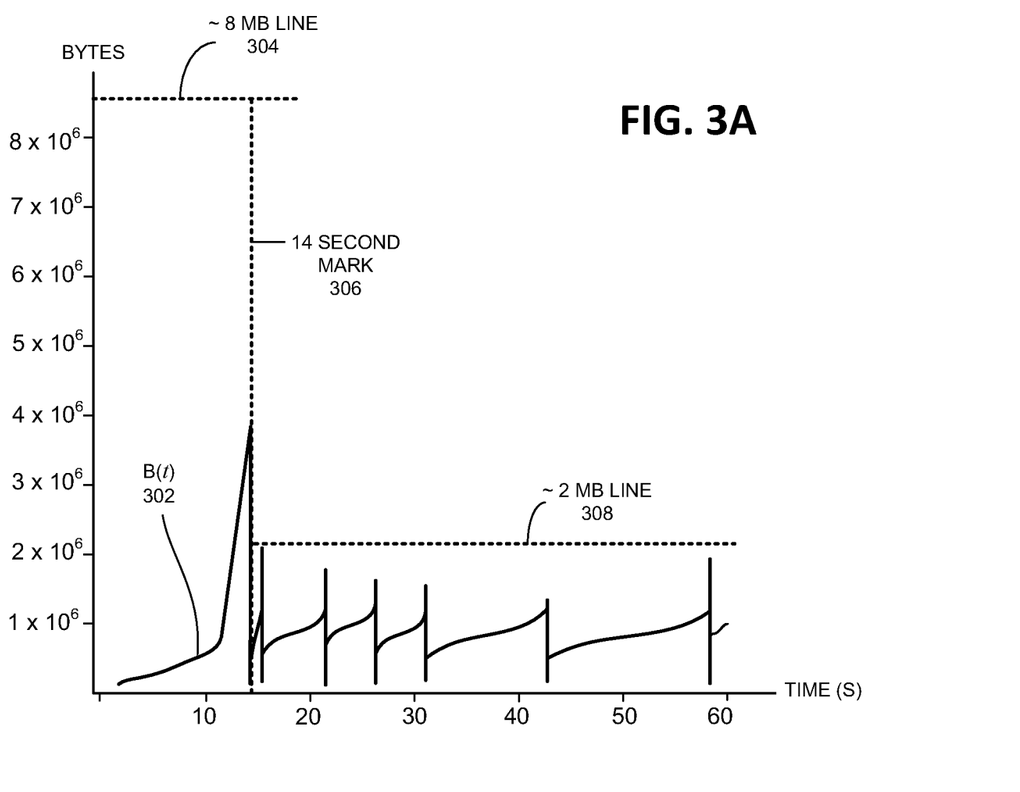
FIG. 3A shows a graph of a receive buffer utilization during a file download in the network environment of FIG. 1.
Figure 3B:
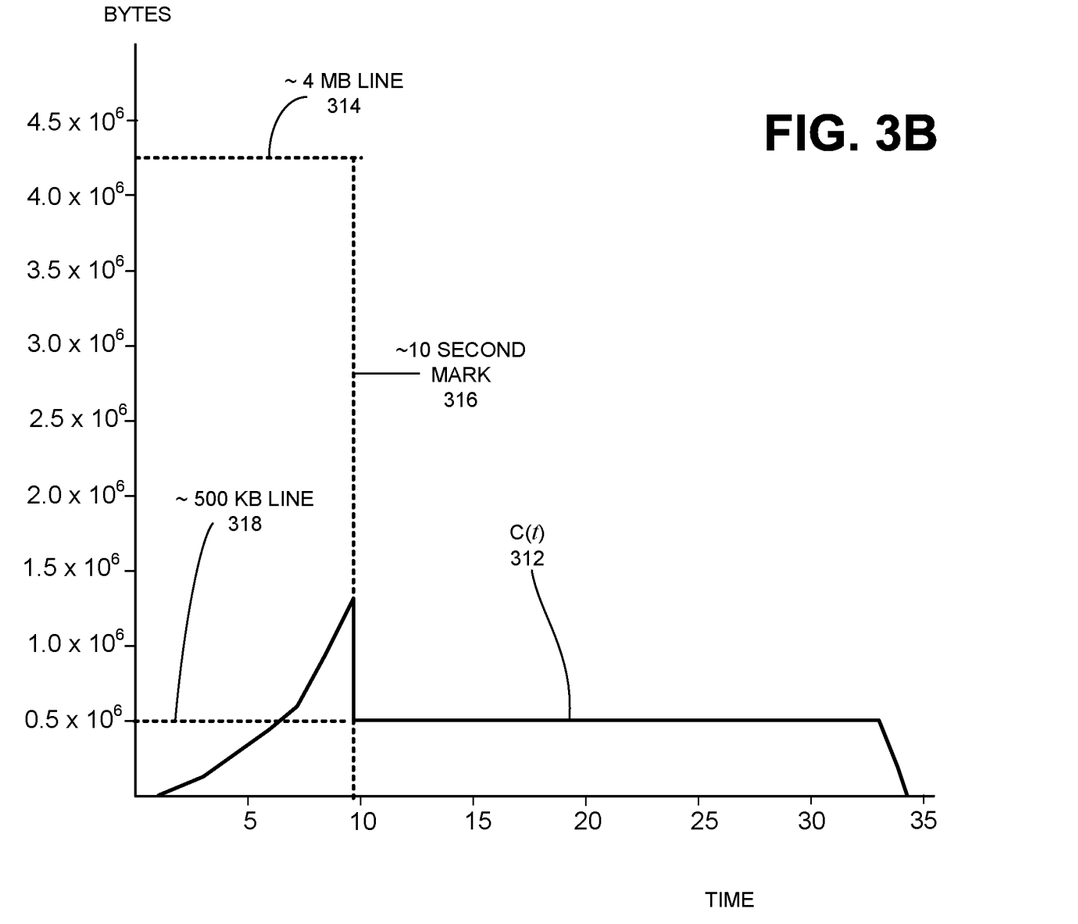
FIGS. 3B and 3C illustrate a disparity in socket buffer utilization for different connections between the User Equipment (UE) device and the network of FIG. 1.
Figure 3C:
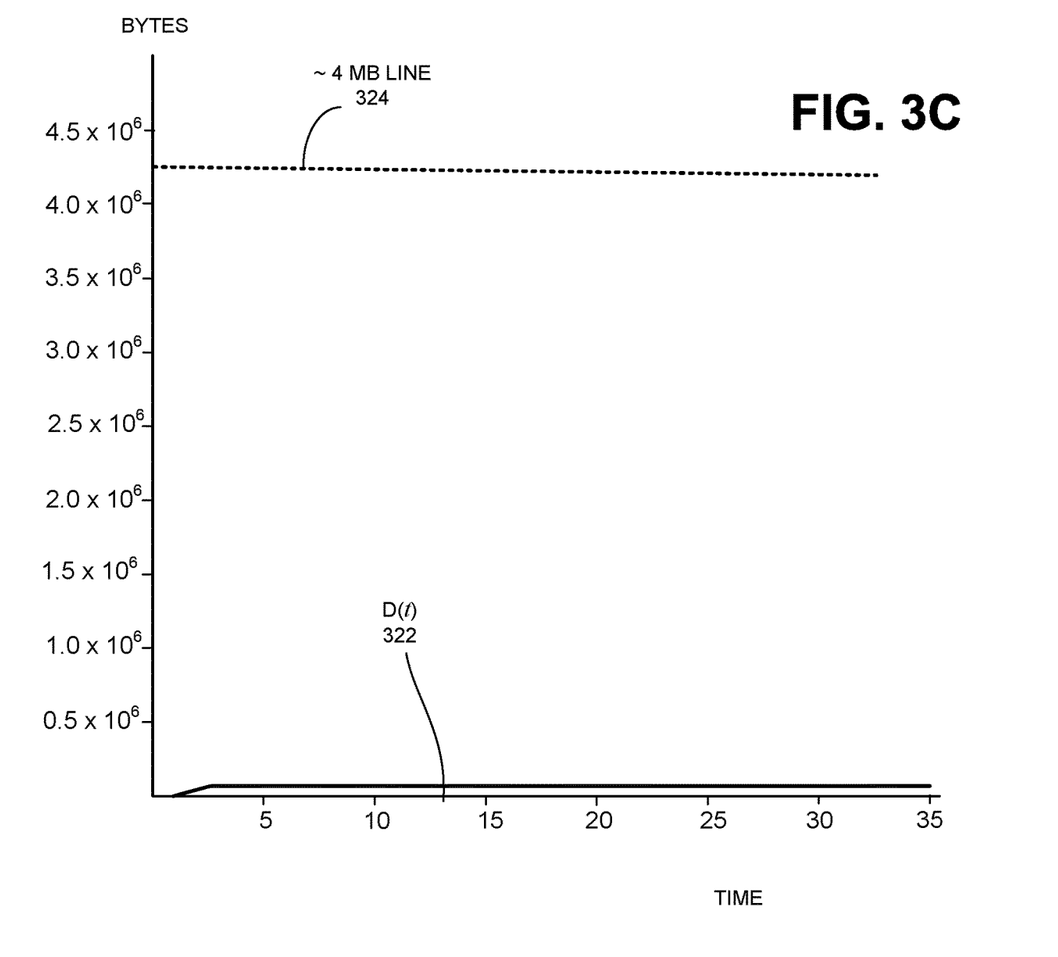

FIGS. 3A-3C illustrate examples of inefficient use of receive buffers 108 of sockets 106 during communication sessions at device 102. In particular FIG. 3A shows an example graph of receive buffer utilization B(t) 302 during an exemplary file download at device 102 (e.g., a smart phone) in network environment 100. In the example, the smart phone may download the file through a single flow over a 5G wireless link.

As shown, the device 102 initially opens a receiving buffer of 8 MB (see ~8 MB line 304) at the time 0 second. Although not shown, within the first 10 seconds, device 102 receives approximately 100 MB of data, whose portion occupies 64 MB of an internal buffer in memory/storage 204. This 64 MB is separate from the 8 MB receive buffer 108. Sensing the rapidly rising traffic from network 104, device 102 signals, to the network 104, to slow down the transmission of the data. More particularly, at the ~14 second mark 306, device 102 decreases the size of the receive buffer (herein denoted by RWIN) to 2 MB (see 2 MB line 308) and indicates to the other session endpoint that it has decreased the receive buffer 108. In response, the other session endpoint throttles its transmission. This can be seen at 14 second mark 306, when B(t) 302 in FIG. 3A decreases to around 1 MB until the end of transmission.

The graph in FIG. 3A indicates that device 102's approach to controlling its receiving buffer 108 is the performance bottleneck. In particular, during the first 10 seconds, device 102 over-allocates its receive buffer 108 (i.e., 8 MB), only to see a fraction of the buffer 108 used for the download. Even after device 102 shrinks its receiving buffer 108 to around 2 MB (i.e., after 14 second mark 306), the overall buffer 108 usage is approximately only around 50%.

FIGS. 3B and 3C illustrate a disparity in socket buffer 108 utilization for different connections between the device 102 and network 104. The disparity indicates uneven performance of communication sessions and user experience—an undesirable feature. For FIGS. 3B and 3C, 30 concurrent downloads are performed for two sets of flows. FIG. 3B illustrates socket buffer utilization for the first set of flows, which includes 5 of the 30 downloads. FIG. 3C illustrates socket buffer utilization for the second set of flows, which includes 25 of the 30 downloads.

In FIG. 3B, for each of its 5 downloads, device 102 initially over-allocates a socket receive buffer 108 at around 4 MB (see 4 MB line 314), and, at 10 second mark 316, shrinks the buffer 108 to about 0.5 MB (see 500 KB line 318). Device 102 indicates to the other session endpoint that it has shrunk its receiving buffer 108, to signal to the other endpoint to throttle its transmission.

In FIG. 3C, for each of the 25 downloads, although device 102 initially sets its receive buffer 108 at 4 MB (see 4 MB line 324), the download rate D(t) 322 remains very low. Accordingly, device 102 does not shrink its buffer 108 to signal to the other endpoint to slow down its transmission, resulting in only a fraction of buffer 108 being used. The initial over-allocation, rather than causing the other endpoint to transmit at a rate suitable for device 102, ends up wastes memory. For the 25 sessions associated with FIG. 3C, receive buffer 108 is too large, while, for the 5 sessions associated with FIG. 3B, receive buffer 108 is not large enough. Although not shown, in FIG. 3B, receive buffer 108 is almost full after the first 10 seconds, and the operating system of device 102 is unable to allocate more buffer space. Clearly, the uneven buffer allocations over the 30 flows of FIGS. 3B and 3C limit the overall throughput, result in inefficient memory utilization, and degrade the overall performance of device 102.

FIGS. 4A-4C and FIG. 5 illustrate exemplary processes that are associated with creating and deleting a socket receive buffer 108 and controlling the size of the buffer 108. Processes 400, 410, 420, and 500 address the problems and issues that are described above with references to FIGS. 3A-3C. The processes provide for more optimal use of memory 204 for receiving data during communication sessions. The processes may be performed by network device 200 executing computer-executable instructions.

Figure 4A:
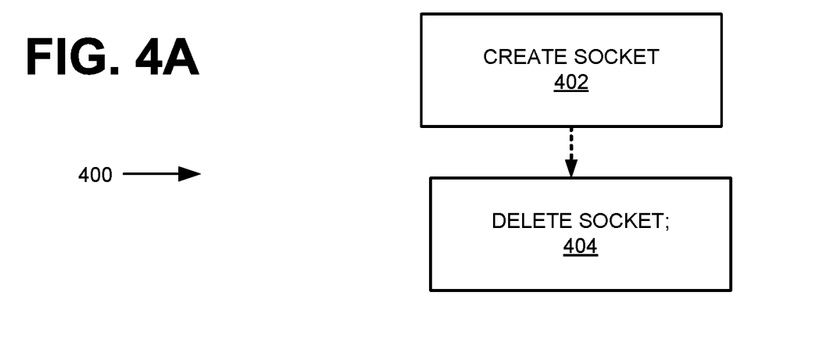
FIGS. 4A-4C illustrate exemplary processes that are associated with creating a socket buffer and deleting the socket buffer according to different implementations.

In FIG. 4A, process 400 includes creating a socket (block 402) and deleting the socket 106 (block 404). Process 400 may be part of an application process whose execution requires establishing a session between the application and another network component (e.g., a server). To begin the session, the application may create a socket 106. After the socket creation, the application may use the socket to participate in the session. When the session terminates, the application may delete the socket 106. Examples of a session includes an HTTP session, a VoIP session, and a messaging (e.g., SMS) session.

Figure 4B:
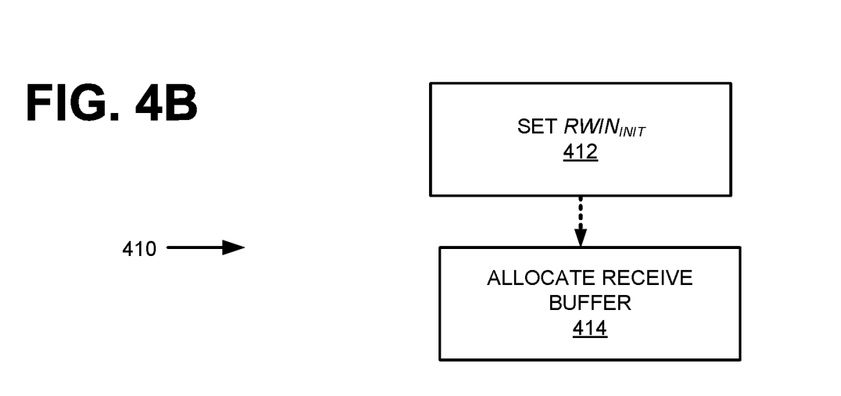

FIG. 4B illustrates creating a socket buffer 108. As shown, process 410 includes at 412 setting the initial size of the socket 106, $RWIN_{INIT}$, to the minimum of two values: M/N and RTT×δ×BW.

For the M/N calculation, M is the total memory that all of the sockets 106 can use, and N is the estimated number of sockets (e.g., the maximum number of open sockets). Accordingly, M/N is the estimated "fair" size of the buffer 108.

In contrast, RTT is the estimated network round trip time, where δ is some multiplicative factor and the BW is the channel bandwidth. Given a network round trip time (RTT), the shortest time at which device 102 can signal to the other session endpoint (i.e., the transmitter) to modify or stop the transmission and obtain a response from the transmitter would be some multiple of the RTT. If the multiple is assumed to be δ, then the expected response time is RTT×δ. Since the channel bandwidth is BW, then it is reasonable to have the receive buffer 108 to be capable of holding the amount of data that could be transmitted during that time. Such buffer size would be given by: RTT×δ×BW, where the default value of δ is to 1 in one implementation.

At block 412, to be conservative, $RWIN_{INIT}$ is set to the minimum of M/N (the socket's fair share) and RTT×δ×BW (the size of the buffer large enough to hold data transmitted until next signaling). Once $RWIN_{INIT}$ is set, process 410 may then allocate the socket buffer 108 at 414 to have the size $RWIN_{INIT}$.

Figure 4C:
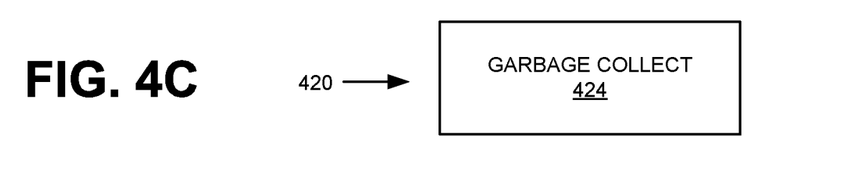

Still referring to process 400, when process 400 deletes the socket 106, receive buffer 108 associated with socket 106 may be reclaimed, by process 400 or by yet another process. For example, in one implementation, device 102 may run a separate process that exclusively manages deleting receive buffer 108 (i.e., returning the buffer 108 to the memory pool). In another implementation, processes 400 and 410 may manage receive buffers 108 with the aid of a garbage collector that implements a mechanism for reclaiming allocated memory that is no longer used. In such implementations, when the session ends, the garbage collector (which may be implemented as a copy collector or a mark-and-sweep collector) may return the buffer 108 to the memory pool. FIG. 4C illustrates process 420 for garbage collection 424. The garbage collector may be run as part of process 400 or a separate process/thread.

Figure 5:
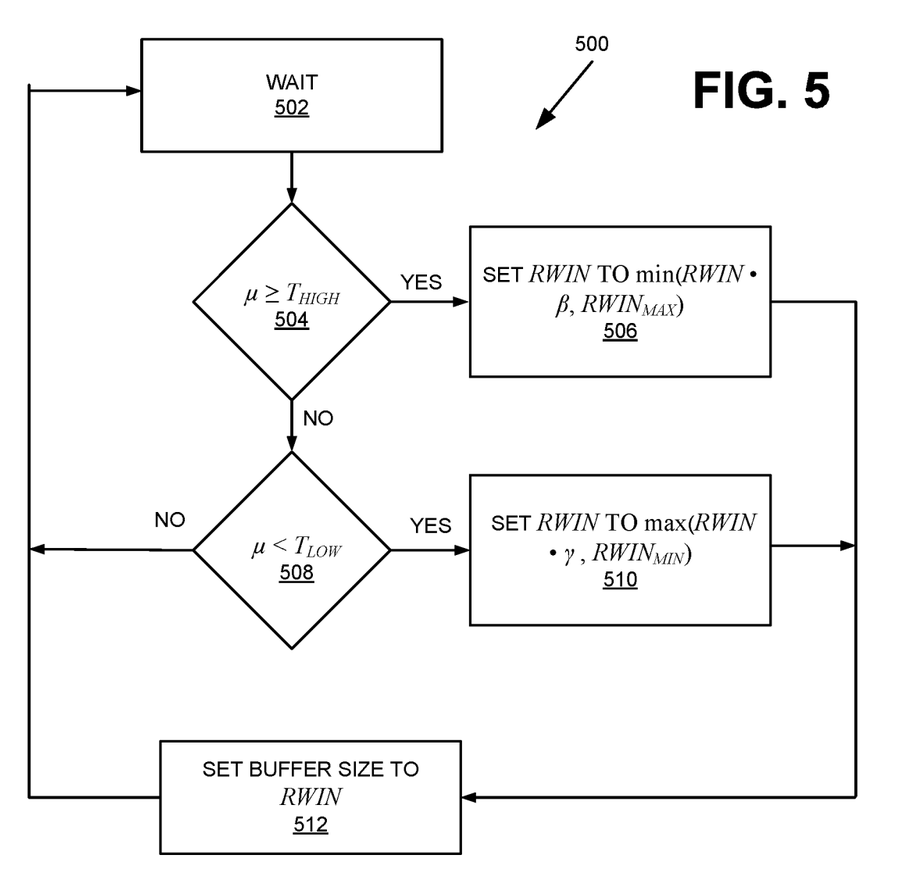
FIG. 5 is an exemplary process that is associated with controlling the size of a socket receive buffer according to one implementation.

FIG. 5 is an exemplary process 500 that is associated with controlling the size of a socket receive buffer 108 according to one implementation. As shown, process 500 may include waiting until process 500 is at a predetermined time interval or epoch, denoted by a (block 502). A particular epoch a may span a multiple of the RTT of the current connection. In FIG. 5, nothing indicates for how long process 500 has already been looping through blocks 502 through 512 to modify its receive buffer size, denoted by RWIN. Accordingly, at block 502, RWIN may or may not be equal to $RWIN_{INIT}$, which would have been set at process 410.

Once process 500 is in the a epoch, process 500 may proceed from block 502 to block 504, to determine whether the current buffer utilization, denoted by p, is greater than or equal to a high buffer threshold, $T_{HIGH}$ (block 504). If the buffer utilization is too high and thus greater than or equal to the threshold $T_{HIGH}$ (block 504: YES), the socket 106 may run out of its allocated memory. Accordingly, process 500 may include increasing RWIN to RWIN times a multiplier β>1. However, since RWIN should not increase without bound (which would deplete the memory pool), process 500 caps RWIN. Therefore, RWIN is set to the minimum of two values: RWIN times a multiplier β>1 and $RWIN_{MAX}$, where $RWIN_{MAX}$ is the upper ceiling for the socket buffer size (block 506). From block 506, process 500 may proceed to block 512. If the buffer utilization is not too high and is less than $T_{HIGH}$ (block 504: NO), process 500 may proceed to block 508.

Process 500 may include determining whether the buffer utilization is too low and is less than a low buffer threshold $T_{LOW}$ (block 508). If the buffer utilization is too low and thus is less than the threshold $T_{LOW}$ (block 508: YES), the socket 106 may be too inefficient with its use of receive buffer 108. Accordingly, process 500 may include decreasing RWIN to a RWIN times a multiplier γ<1. However, since RWIN should not decrease to an arbitrarily small number, process 500 sets a floor for RWIN. Therefore, RWIN is set to the maximum of RWIN×γ and $RWIN_{MIN}$, where $RWIN_{MIN}$ is the floor for the socket buffer size (block 510). From block 510, process 500 may proceed to block 512. If the buffer utilization is not too low and is not less than $T_{LOW}$ (block 508: NO), process 500 may return to block 502.

Process 500 may include setting the size of the receive buffer 108 to RWIN (block 512) and proceed to block 502. At block 512, setting the size of buffer 108 may include allocating a new memory block having the RWIN size, and returning the previously allocated buffer 108 to the memory pool. Returning the previously allocated buffer 108 may be performed through an explicit system call (e.g., operating system call) or by an automatic memory manager, such as a garbage collector. If a garbage collector is used, any reference to the previous buffer 108 to be deallocated must be set to null, so that the garbage collector knows the previous buffer 108 is no longer in use.

Depending on the implementation, process 500 may be performed as part of process 400, by a separate thread or process for managing receipt of information over a session, or by a separate thread or a process for managing the N-sockets. In the latter implementation, the thread or the process may include mechanisms for inter-thread/process signaling, such as semaphores, wait-for-event objects, mutual exclusion (MUTEX) objects, spinlocks, atomic instructions, etc., to prevent concurrent reading or writing onto the buffer 108 while process 500 is modifying the size of buffer 108.

Figure 6:
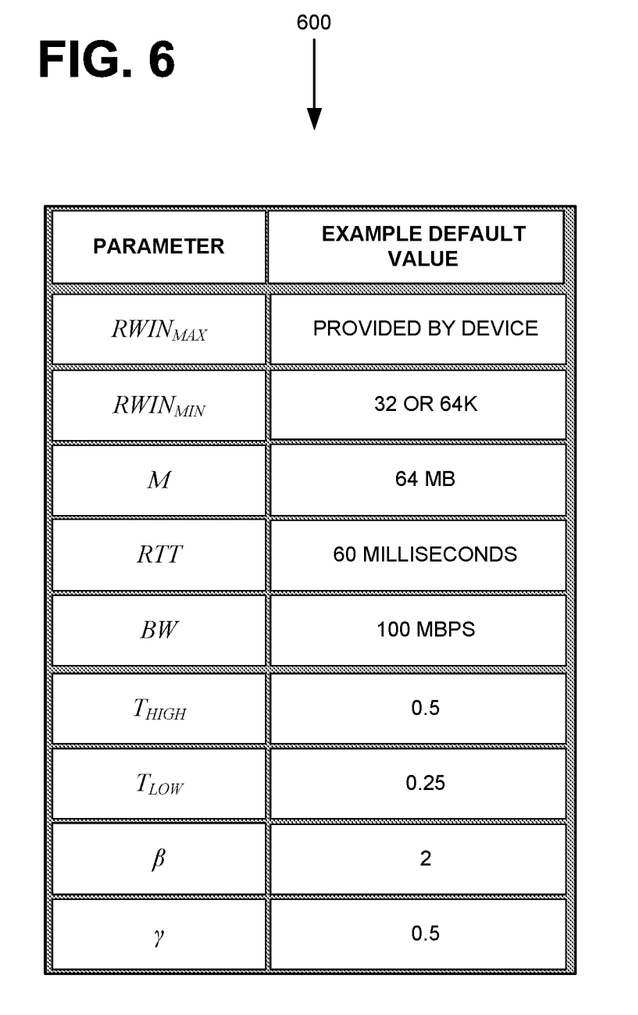
FIG. 6 shows a table of exemplary default values of the parameters in the processes of FIGS. 4A-4C and FIG. 5.

FIG. 6 shows a table 600 of exemplary default values of the parameters in the processes 400 and 410. These parameters reflect the limitations and/or capabilities of device 102 and network 104. For example, when device 102 is implemented as a smart phone, device 102 includes a relatively few number of sessions/flows, typically due to the limitations of the smart hone. For example, according to some implementations, a smart phone may run one foreground application at a time. Accordingly, in such implementations, the estimated number of sockets (N) on device 102 would be assumed to be less than 10.

In process 500, to avoid making RWIN adjustment that is too large or too small, process 500 uses two parameters $RWIN_{MAX}$ and $RWIN_{MIN}$ as the upper and lower bounds. As shown in table 600, in some implementations, $RWIN_{MAX}$ is stored in device 102 (e.g., at a system control variable sysctl) net.ipv4.tcp_rmem. $RWIN_{MIN}$ is set to 64 MB.

In some implementations, the default values of RTT and BW are based on the assumption that network 104 is an LTE network (e.g., 60 milliseconds and 100 Mbps), which implies $RWIN_{INIT}$ of 0.75 MB. If the number of active flows is low, in process 500, $RWIN_{INIT}$ is mostly likely to be set to RTT×δ×BW, rather than to M/N.

By implementing processes 400, 410, 500, and/or 410, device 102 and network 104 may reduce congestion along the network path. In prior implementations of aggressive TCP congestion control protocol/methods, a large receiving buffer size permits the sender (e.g. performance enhancement proxy) to send more packets over the air before the sender receives any acknowledgement from device 102. The high volume of packets in flight may significantly increase the end-to-end delay, which may allow the sender to send even more data, as the bandwidth delay product is increased. This "positive" feedback would trigger congestion at the base station (e.g., eNodeB or gNodeB) in network 104, introducing unnecessary queue drops. In contrast, processes 400, 410, and 500 limit such unnecessary queue drops by adjusting the receiving buffer 108 efficiently.

Processes 400, 410, and 500 may be implemented on devices 102 attached to various types of networks (e.g., 4G network or 5G network) that involve any TCP or User Datagram Protocol (UDP) communications. For example, assuming that the RTT can be measured for UDP communications, process 400, 410, 500, and/or 420 may be implemented for UDP-based applications. Additionally, the receiving buffer space may not be limited to transport layer socket buffer space (the L4 buffer). Processes 400, 410, 500, and/or 520 may also be used for the link layer (e.g., the RLC layer) receiving buffer.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 4A-4C and 5, the order of the blocks and signaling may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A network device comprising:
a network interface for establishing a communication session with another network device;
a memory to store instructions; and
a processor to execute the instructions to:
for each time period during the communication session, adjust a size of a receive buffer of a socket, wherein when the processor adjusts the size, the processor is to:
when a utilization number of the receive buffer is greater than a high threshold:
determine a first new size for the receive buffer, and
set a size of the receive buffer to the first new size; and
when the utilization number is less than a low threshold:
determine a second new size for the receive buffer; and
set the size of the receive buffer to the second new size;
wherein the socket is at one of two endpoints of the communication session,
wherein the first new size is a minimum of a first value and a second value,
wherein the first value is equal to a current size of the receive buffer times a multiplier greater than one, and
wherein the second value is equal to a predetermined ceiling on the size of the receive buffer.

2. The network device of claim 1, wherein the processor is further to:
create the socket when the processor establishes the communication session.

3. The network device of claim 1, further comprising a memory pool, wherein the processor is further to:
determine an initial buffer size; and
allocate, from the memory pool, the receive buffer having the initial buffer size.

4. The network device of claim 3, wherein the initial buffer size is a minimum of a first value and a second value,
wherein the first value is equal to M/N,
wherein M is a total amount of memory available from the memory pool for allocating receive buffers,
wherein N is a predetermined number of sockets that the network device can create,
wherein the second value is equal to RTT×δ×BW,
wherein BW is a bandwidth of the communication session, wherein RTT is a round trip time of a packet through a network over which the communication session was established, and
δ is a predetermined multiplier.

5. The network device of claim 1, wherein the second new size is a maximum of a first value and a second value,
wherein the first value is equal to a current size of the receive buffer times a multiplier less than one, and
wherein the second value is equal to a predetermined floor on the size of the receive buffer.

6. The network device of claim 1, further comprising a memory pool, wherein the processor is to:
de-allocate the receive buffer to return the receive buffer to the memory pool, when the communication session terminates.

7. The network device of claim 1, further comprising a memory pool, wherein when the processor sets the size of the receive buffer to the first new size, the processor is to:
de-allocate the receive buffer to return the receive buffer to the memory pool; and
reallocate the receive buffer having the first new size, and
wherein when the processor sets the size of the receive buffer to the second new size, the processor is to:
de-allocate the receive buffer to return the receive buffer to the memory pool; and
reallocate the receive buffer having the second new size.

8. The network device of claim 1, wherein the utilization number is an amount of the receive buffer used to store data received over the communication session divided by the size of the receive buffer.

9. A method comprising:
for each time period during a communication session between a network device and another network device, adjusting, by the network device, a size of a receive buffer of a socket, wherein adjusting the size includes:
when a utilization number of the receive buffer is greater than a high threshold:
determining a first new size for the receive buffer; and
setting a size of the receive buffer to the first new size; and
when the utilization number is less than a low threshold:
determining a second new size for the receive buffer; and
setting the size of the receive buffer to the second new size,
wherein the socket is at one end of the communication session,
wherein the first new size is a minimum of a first value and a second value,
wherein the first value is equal to a current size of the receive buffer times a multiplier greater than one, and
wherein the second value is equal to a predetermined ceiling on the size of the receive buffer.

10. The method of claim 9, further comprising:
creating the socket, by the network device, when the network device is establishing the communication session.

11. The method of claim 9, further comprising:
determining, by the network device, an initial buffer size; and
allocating, by the network device, from a memory pool, the receive buffer having the initial buffer size, wherein the network device includes the memory pool.

12. The method of claim 11, wherein the initial buffer size is a minimum of a first value and a second value,
wherein the first value is equal to M/N,
wherein M is a total amount of memory available from the memory pool for allocating receive buffers,
wherein N is a predetermined number of sockets that the network device can create,
wherein the second value is equal to RTT×δ×BW,
wherein BW is a bandwidth of the communication session,
wherein RTT is a round trip time of a packet through a network over which the communication session was established, and
δ is a predetermined multiplier.

13. The method of claim 9, wherein the second new size is a maximum of a first value and a second value,
wherein the first value is equal to a current size of the receive buffer times a multiplier less than one, and wherein the second value is equal to a predetermined floor on the size of the receive buffer.

14. The method of claim 9, further comprising:
when the communication session terminates, de-allocating the receive buffer to return the receive buffer to a memory pool, wherein the network devices includes the memory pool.

15. The method of claim 9, wherein setting the size of the receive buffer to the first new size includes:
de-allocating, by the network device, the receive buffer to return the receive buffer to a memory pool; and
reallocating, by the network device, the receive buffer having the first new size, and
wherein setting the size of the receive buffer to the second new size includes:
de-allocating, by the network device, the receive buffer to return the receive buffer to the memory pool; and
reallocating, by the network device, the receive buffer having the second new size,
wherein the network device includes the memory pool.

16. The method of claim 9, wherein the utilization number is an amount of the receive buffer used to store data received over the communication session divided by the size of the receive buffer.

17. A non-transitory computer-readable medium comprising computer-executable instructions, when executed by a processor included in a network device, that cause the processor to:
for each time period during a communication session between the network device and another network device, adjust a size of a receive buffer of a socket, wherein when the processor adjusts the size of the receive buffer, the processor is to:
when a utilization number of the receive buffer is greater than a high threshold:
determine a first new size for the receive buffer; and
set a size of the receive buffer to the first new size; and
when the utilization number is less than a low threshold:
determine a second new size for the receive buffer; and
set the size of the receive buffer to the second new size,
wherein the socket is at one end of the communication session,
wherein the first new size is a minimum of a first value and a second value,
wherein the first value is equal to a current size of the receive buffer times a multiplier greater than one, and
wherein the second value is equal to a predetermined ceiling on the size of the receive buffer.

18. The non-transitory computer-readable medium of claim 17, wherein the processor is further to:
create the socket when the processor establishes the communication session.

19. The non-transitory computer-readable medium of claim 17, wherein the second new size is a maximum of a first value and a second value,
wherein the first value is equal to a current size of the receive buffer times a multiplier less than one, and
wherein the second value is equal to a predetermined floor on the size of the receive buffer.

20. The non-transitory computer-readable medium of claim 17, wherein the utilization number is an amount of the receive buffer used to store data received over the communication session divided by the size of the receive buffer.

* * * * *